April 29, 1952 — R. D. OWEN — 2,595,165
FOLLOW-UP CONTROL
Filed Aug. 9, 1946
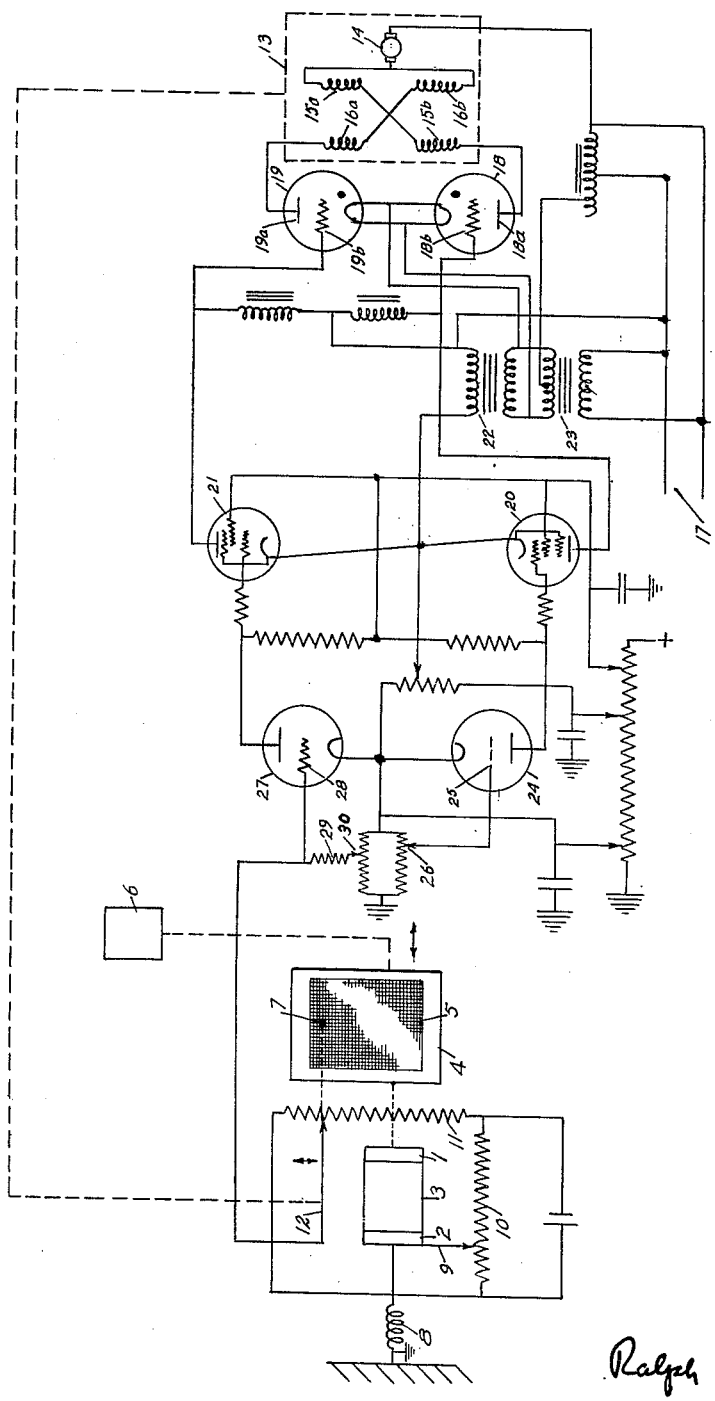
Inventor
Ralph D Owen
By Ralph Hamner
Attorney Patented Apr. 29, 1952

2,595,165

UNITED STATES PATENT OFFICE 2,595,165

FOLLOW-UP CONTROL

Ralph D. Owen, Erie, Pa., assignor to Lord Manufacturing Company, Erie, Pa., a corporation of Pennsylvania Application August 9, 1946, Serial No. 689,427

2 Claims. (Cl. 318—28)

Follow-up motor control circuits have been proposed using a reversible series motor with field windings for each direction of rotation fed from amplifiers for control impulses. This invention is intended to improve the response and to eliminate hunting or overshooting of the motor beyond the point corresponding to the control impulses. In a preferred form, the field windings for the respective directions of rotation are equally distributed on the pole pieces instead of being arranged on alternate pole pieces, thus reducing the leakage reactance between the field windings. The field windings are fed from phase controlled gaseous discharge devices which conduct on alternate half cycles. The phase control is such that at the balance point both devices conduct and produce equal and opposite fields and at one side of the balance point a greater or lesser field is produced by one of the field windings resulting in a net field tending to rotate the motor toward the balance point. Further objects and advantages appear in the specification and claims.

In the drawing, the single figure is a control diagram showing the follow-up control applied to a testing machine.

Referring to the drawing, the control is shown applied to a tensile testing machine having members 1 and 2 secured to opposite ends of a test sample 3. The member 1 is fixed to a table 4 carrying a sheet of graph paper 5 and moved back and forth in a horizontal direction by a motor 6. The extent of the horizontal movement of the member 1 is indicated on the graph paper by a stylus 7. The member 2 is connected to a spring 8 which resists stretching of the test sample. For any horizontal position of the member 1, the position assumed by the member 2 will depend upon the modulus of elasticity of the test sample. The position of the member 2 accordingly corresponds to the stress in the test sample.

Associated with the member 2 is an arm 9 slidably engaging a resistance 10 forming with a resistance 11 a bridge circuit. An arm 12 slidably engages the resistance 11. The arms 9 and 12 are connected (through resistance 29, spring 8 and ground) across the midpoints of the bridge circuit. The arm 12 is mechanically connected to the stylus 7 and is displaced vertically by a motor 13 controlled so that the arm 12 is maintained in the balanced position for the bridge. The stylus 7 is accordingly positioned vertically to a position indicating the stress in the test sample corresponding to the horizontal displacement of the member 1.

The motor 13 is a series motor having an armature winding 14 and field windings 15a, 15b and 16a, 16b respectively causing rotation of the motor in opposite directions. The field windings 15a and 16a are arranged on one pole piece and the field windings 15b and 16b are arranged on the other pole piece. This decreases the leakage reactance between the field windings and tends to eliminate hunting or overshooting of the motor. The motor is connected across an A. C. supply 17, the field windings 15a and 15b being connected through a grid controlled gaseous discharge device 18 and the field windings 16a and 16b being connected through a grid controlled gaseous discharge device 19. The devices 18 and 19 fire on alternate half cycles when the anodes 18a and 19a are positive. On intermediate half cycles when the anodes are negative, the current through the devices 18 and 19 is interrupted. The firing points for the devices 18 and 19 are controlled by grids 18b and 19b respectively fed from phase shifting amplifiers 20 and 21 energized through a transformer 22 connected through a filament transformer 23 to the A. C. supply 17. Under balanced conditions, when the motor 13 is at rest, the phase of the voltage applied to the grids 18b and 19b is the same, causing simultaneous firing of the devices 18 and 19 and therefore resulting in equal currents in the field windings 15a, 15b and 16a, 16b. The field windings therefore have equal and opposite effects. This arrangement for supplying equal and opposite currents to the field windings at the balanced condition substantially decreases the tendency of the motor to hunt or overshoot. This tendency is further decreased by splitting the windings so that parts of both windings are arranged on the same pole piece, thus decreasing the leakage reactance between the field windings.

The phase shift amplifier 20 controlling the firing point of the device 18 is fed from a D. C. amplifier 24 having a grid 25 connected to an adjustable bias 26. The phase shift amplifier 21 controlling the device 19 is fed from a D. C. amplifier 27 having a grid 28 connected through a coupling resistance 29 to an adjustable bias 30. The grid 28 is also connected to the arm 12 so that in addition to the voltage from the bias 30, the grid is also supplied with voltage from the arm 12 which is positive or negative, depending upon the relative position of the arm 12 with respect to the arm 9. Under balanced conditions when the voltage on the arm 9 exactly balances the voltage on the arm 12, the voltage supplied to the grid 28 from the arm 12 is zero. When the arm 12 leads or lags the arm 9, the voltage from the arm 12 causes a shift in the phase angle of the output of the amplifiers 20 and 21 and produces a change in the firing points of the devices 18 and 19. Under these conditions the fields 15a, 15b and 16a, 16b no longer balance each other and the motor runs in the direction to move the arm 12 to the position corresponding to or balancing the arm 9.

What I claim as new is:

1. In a follow-up motor control, a reversible series motor having field windings for the respective directions of rotation wound on the same pole piece and each fed from an alternating current supply through a grid controlled gaseous discharge device, phase control amplifiers controlling the phase angle at which the respective discharge devices fire, said amplifiers being biased to fire the discharge devices simultaneously at the balanced condition and produce cancelling effects in the motor, and means responsive to the lag or lead of the motor with respect to the condition to be followed for changing the bias on one of the amplifiers in the sense to cause movement of the motor toward the balanced condition.

2. In a follow-up motor control, a reversible series motor having field windings for the respective directions of rotation wound on the same pole piece, means simultaneously supplying the windings with balanced D. C. pulses of current whereby the motor remains stationary, and means responsive to the difference between the position of the motor and a condition to be followed unbalancing the current supply to the respective windings to cause rotation of the motor in the direction to follow the condition.

RALPH D. OWEN.

REFERENCES CITED

The following references are of record in the file of this patent:

UNITED STATES PATENTS

| Number | Name | Date |
| --- | --- | --- |
| 1,070,647 | Whittingham | Aug. 19, 1913 |
| 2,040,014 | Moseley | May 5, 1936 |
| 2,047,984 | Riggs | July 21, 1936 |
| 2,105,598 | Hubbard | Jan. 18, 1938 |
| 2,153,986 | MacLaren | Apr. 11, 1939 |
| 2,154,375 | Chambers | Apr. 11, 1939 |